(12) United States Patent
Klevan et al.

(10) Patent No.: US 6,478,840 B1
(45) Date of Patent: Nov. 12, 2002

(54) REDUCTION OF CHROMIUM CONTENT IN SLAG DURING MELTING OF STAINLESS STEEL IN ELECTRIC ARC FURNACES

(75) Inventors: Ole Svein Klevan, Orkanger (NO); Jacob Sandberg, Oslo (NO)

(73) Assignee: Elkem ASA (NO)

( * ) Notice: Subject to any disclaimer, the term of this patent is extended or adjusted under 35 U.S.C. 154(b) by 0 days.

(21) Appl. No.: 09/857,516

(22) PCT Filed: Jan. 20, 1999

(86) PCT No.: PCT/NO99/00015

§ 371 (c)(1),
(2), (4) Date: Jun. 4, 2001

(87) PCT Pub. No.: WO00/34532

PCT Pub. Date: Jun. 15, 2000

(30) Foreign Application Priority Data

Dec. 9, 1998 (NO) .................................................. 985757

(51) Int. Cl.$^7$ ................................................. C21C 5/52
(52) U.S. Cl. ..................................................... 75/10.51
(58) Field of Search ............................... 75/10.51, 537, 75/567, 316

(56) References Cited

U.S. PATENT DOCUMENTS

| | | | |
|---|---|---|---|
| 2,847,301 A | | 8/1958 | Shaw |
| 3,278,294 A | * | 10/1966 | Feldmann et al. ............ 75/567 |
| 3,575,696 A | | 4/1971 | Rehmus et al. |
| 4,090,869 A | | 5/1978 | Antoine et al. |

* cited by examiner

Primary Examiner—Melvyn Andrews
(74) Attorney, Agent, or Firm—Bierman, Muserlian and Lucas

(57) ABSTRACT

The present invention relates to a method for reduction of chromium content in slag during melting of stainless steel in electric arc furnaces where steel scrap and additive alloys are melted in an electric steel furnace, whereafter molten steel and slag are tapped into a ladle, removal of the slag from the steel in the ladle, transferring of the molten steel from the ladle to a converter wherein the steel is refined and where the chemical composition of the steel is adjusted by addition of alloying elements. According to the invention fine particulate ferrosilicon is added to the slag during the time interval between the slag and the steel are melted, but before the molten steel and slag is tapped into the ladle.

10 Claims, No Drawings

REDUCTION OF CHROMIUM CONTENT IN SLAG DURING MELTING OF STAINLESS STEEL IN ELECTRIC ARC FURNACES

TECHNICAL FIELD

The present invention relates to a method for production of stainless steel.

TECHNICAL BACKGROUND

By scrap-based production at stainless steel, steel scrap and alloying materials are melted in electric arc furnaces. The steel scrap can be both stainless steel scrap and carbon steel scrap while the alloying materials mainly consists of FeCr and nickel or nickel alloys. After melting in the electric arc furnace the steel, which has a high content of carbon, is tapped into a ladle where the slag is removed before the molten steel is transferred to a converter where it is refined in order to obtain a preset carbon content and where the final chemical analysis of the stainless steel is adjusted by the addition of additive materials before the steel is being cast.

By stainless steel it shall herein be understood steel having a chromium content of 4% by weight or more.

During melting of steel scrap and alloying materials in the electric arc furnace some oxygen is being added as a part of the raw materials and some oxygen from the surroundings is being picked up by the melt. Thus a part of the easiest oxidizable elements in the steel scrap and in the alloying materials will be oxidized and form part of the slag. One of the most valuable elements which is easily oxidized is chromium and as the slag from the steel furnaces usually is dump or placed landfills, the chromium content in the slag is lost. A high chromium content in the slag is further an environmental problem.

In order to avoid losses of chromium in the slag it is conventional practice to add silicon to the charge together with steel scrap and alloying elements during melting in the electric arc furnace. Silicon is added in the form of lumpy ferrosilicon or in the form of other silicon-rich alloys such as for instance SiCr.

Even if silicon is added in order to prevent oxidation of chromium, the slag may after melting of the charge, contain a high and varying amount of chromium oxide. This is due to a number of factors, such that the exact amount of oxygen which enters the melt in the arc furnace is not known, thus making it impossible to calculate the correct amount of silicon to be added. By a too low addition of silicon the chromium content in the slag will be unacceptably high, while a too high addition of silicon will give a too high content of silicon in the steel which is transferred to the converter and which in turn will give rise to an increased amount of slag during the refining, increased lining wear in the converter and increased refining time, which gives a lower productivity and a higher production cost. Another problem by addition of lumpy ferrosilicon together with the scrap is that one will have an inhomogeneous distribution of the supplied silicon. It may then not be sufficient time for the supplied silicon to react with chromium oxide in the slag. Sometimes this can give a slag with a very high viscosity which can make it difficult to tap the slag from the furnace such that the slag has to be remelted in the electric arc furnace during the next batch and, in addition, one will obtain a crude steel with an extremely high silicon content in the converter.

In addition to what is discussed above, it is a wish during melting of stainless steel in electric arc furnaces to use so-called foaming slag. In order to obtain foaming slag, carbon-containing materials are added to the slag whereby CO bubbles are formed in the slag by the reaction between carbon and oxides in the slag, for instance chromium oxide. The formed CO bubbles results in foaming slag. Foamed slag is more reactive than normal slag and due to its volume, it protects the furnace lining against heat from the arc. This means that the furnace can be run at a higher power that results in an increase in the melting capacity of the furnace. It has, however, been found that it can be difficult to start the slag foaming process, especially if the slag has a high content of chromium oxide.

DISCLOSURE OF INVENTION

By the present invention one has now arrived at a method for reduction of the chromium oxide in the slag during production of stainless steel in electric arc furnaces at the same time as a low content of silicon is obtained in the steel produced in the electric arc furnace. Finally, by the present invention one can in a simple and reliable way ensure the formation of foaming slag during the melting process.

Accordingly, the present invention relates to a method for reduction of chromium content in slag during melting of stainless steel in electric arc furnaces where steel scrap and additive alloys are melted in an electric steel furnace, whereafter molten steel and slag are tapped into a ladle, removal of the slag from the steel in the ladle, transferring of the molten steel from the ladle to a converter wherein the steel is refined and where the chemical composition of the steel is adjusted by addition of alloying elements, said method being characterized in that fine particulate ferrosilicon is added to the slag during the time interval between the slag and the steel are melted, but before the molten steel and slag is tapped into the ladle.

According to a preferred embodiment of the present invention, a part of the fine particulate ferrosilicon is added to the slag as soon as molten slag is formed in order to initiate foaming of the slag, while the remaining part of the fine particulate ferrosilicon is added shortly before the molten steel and slag are transferred from the electric arc furnace to the ladle in order to reduce the content of chromium oxide in the slag.

According to another embodiment of the method according to the present invention the fine particulate ferrosilicon is added to the surface of the slag.

According to another embodiment of the method according to the present invention the fine particulate ferrosilicon is injected into the slag.

According to another embodiment of the method according to the present invention it is added fine particulate ferrosilicon in an amount sufficient to reduce all chromium oxide in the slag to elemental chromium.

The fine particulate ferrosilicon has preferably a particle size between 0.1 and 5 mm. Particularly good results are obtained by adding fine particulate ferrosilicon having a particle size between 0.3 and 3 mm and which contains between 65 and 80% by weight of silicon. The fine particulate ferrosilicon is preferably water granulated ferrosilicon having a particle size between 0.3 and 3 mm. Water granulated ferrosilicon consists of substantially spherical shaped particles which are easy to transport by pneumatic transport.

It has surprisingly been found that by the method according to the present invention a major part of chromium in the slag can be recovered at the same time as the steel which is tapped from the electric arc furnace has a stable and low content of silicon. By addition of fine particulate ferrosilicon to the surface of the slag or into the slag it is obtained a high contact area between the slag and fine particulate ferrosilicon as the fine particulate ferrosilicon is easily distributed over the whole surface of the furnace. This gives a very fast reaction between silicon and chromium oxide in the slag. Further, the time needed for melting of the fine particulate ferrosilicon is substantially lower than for melting lumpy ferrosilicon. It was further surprising to find that if a part of the fine particulate ferrosilicon is added just after the slag is melted, initiation of slag foaming is obtained. It is believed that the reason for this is that the early addition of fine particulate ferrosilicon reduces the amount of chromium oxide particles in the slag.

Tests with injection of water granulated ferrosilicon having a particle size between 0.3 and 3 mm in accordance with the present invention have shown that the content of chromium in the slag can be reduced by at least 50% compared to what is obtained by conventional practice and without increasing the silicon content in the steel.

What is claimed is:

1. An improved method for reducing chromium content in slag during production of stainless steel in an electric arc furnace from steel scrap wherein the production of the stainless steel includes the successive steps of melting steel scrap and additive alloys in the electric arc furnace to form molten steel and slag, separating the molten steel and slag, refining the molten steel in a converter wherein the chemical composition of the steel is adjusted by addition of alloying elements, wherein the improvement comprises:

adding a fine particulate ferrosilicon to the slag during the melting step and before the separating step to reduce chromium content in the slag.

2. Method according to claim 1 characterized in that said adding step comprises:

foaming said slag by adding a portion of fine particulate ferrosilicon to the slag as soon as molten slag is formed; and subsequently adding the remaining part of the fine particulate ferrosilicon shortly before said separating step.

3. Method according to claim 1, characterized in that the fine particulate ferrosilicon is added to the surface of the slag.

4. Method according to claim 1, characterized in that the fine particulate ferrosilicon is injected into the slag.

5. Method according to claim 1, characterized in that the fine particulate ferrosilicon is added in an amount sufficient to reduce all chromium oxide in the slag to elemental chromium.

6. Method according to claim 1, characterized in that the fine particulate ferrosilicon has a particle size between 0.1 and 5 mm.

7. Method according to claim 6, characterized in that the fine particulate ferrosilicon has a particle size between 0.3 and 3 mm and contains between 65 and 80% by weight of silicon.

8. Method according to claim 7, characterized in that the fine particulate ferrosilicon is water granulated ferrosilicon.

9. Method according to claim 2, characterized in that the fine particulate ferrosilicon is added to the surface of the slag.

10. Method according to claim 2, characterized in that the fine particulate ferrosilicon is injected into the slag.

* * * * *